Oct. 26, 1937. T. JOHNSON Re. 20,540

CASEMENT WINDOW STRUCTURE

Original Filed April 26, 1929 3 Sheets-Sheet 1

INVENTOR.
T. JOHNSON
BY Watson E. Coleman,
ATTORNEY.

Oct. 26, 1937. T. JOHNSON Re. 20,540
CASEMENT WINDOW STRUCTURE
Original Filed April 26, 1929 3 Sheets-Sheet 2
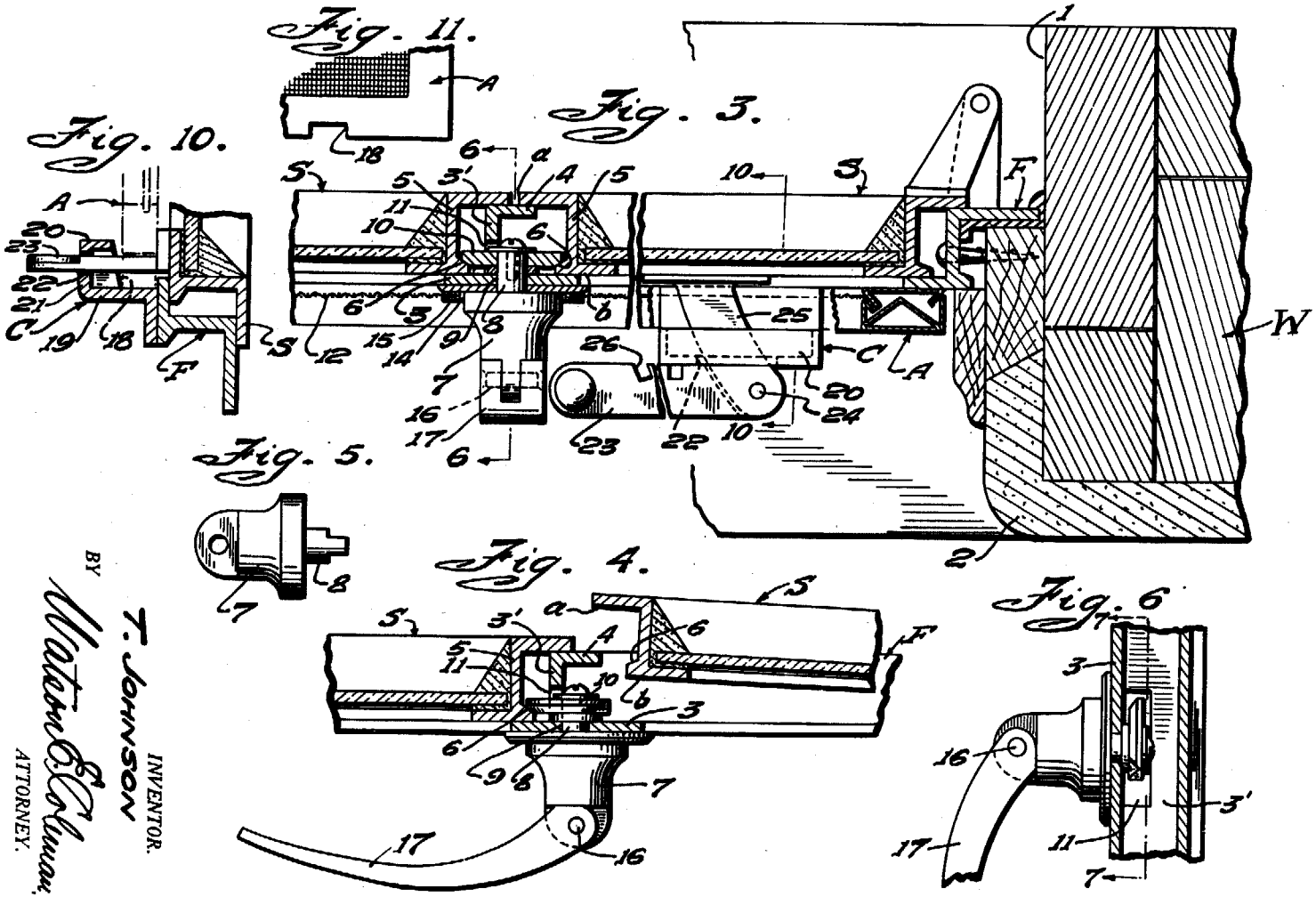
INVENTOR.
T. JOHNSON
BY Watson E. Coleman
ATTORNEY.

Oct. 26, 1937. T. JOHNSON Re. 20,540

CASEMENT WINDOW STRUCTURE

Original Filed April 26, 1929 3 Sheets-Sheet 3

INVENTOR.
T. JOHNSON
BY Watson E. Coleman,
ATTORNEY.

UNITED STATES PATENT OFFICE 20,540

CASEMENT WINDOW STRUCTURE

Theodore Johnson, Erie, Pa., assignor to Johnson Metal Products Co., Erie, Pa.

Original No. 1,805,403; dated May 12, 1931, Serial No. 358,389, April 26, 1929. Application for reissue September 9, 1937, Serial No. 163,115

24 Claims. (Cl. 189—69)

This invention relates to casement window structures and it is primarily an object of the invention to provide a window frame and sash assembled as a unit for positioning in a wall opening and wherein the unit as it is put in place includes a lock.

Another object of the invention is to provide a casement window structure which as a unit may be placed within a window opening and operated by a handle from within the opening itself and thus distinguishes from the structures which are largely built on the job.

Furthermore, it is an object of the invention to provide a window structure having a casement window frame and sash as a unit and which is readily insertible within a wall opening without interfering with the wall opening facing or trim.

A still further object of the invention is to provide a casement window assembly unit comprising a frame for positioning in a wall opening together with an outswinging sash on the frame and a window lock mounted on the frame, said lock being within the wall opening and operable from inside of the window by a handle within the opening when the unit is in place.

The invention also contemplates the provision of a casement window assembly unit comprising a frame for positioning within a wall opening and a sash seating on the frame together with a screen having a screen frame insertible in the wall opening and mounted on the inside face of the window frame adjacent to the sash when closed.

The invention also has for an object the provision of a casement window structure in which the frame and sash are assembled as a unit for positioning in a wall opening together with an actuator secured to the sash and mounted on the frame within the opening so that when the unit assembly is placed in the wall opening the actuator is also in said wall opening and does not interfere with or depend upon other window structure or finish.

The invention also contemplates the provision of a casement window structure embodying a window frame and an associated out-swinging sash together with a locking means and an actuator for the sash operable from within a wall opening and without disturbing a screen disposed over the inner face of the frame and closely adjacent to the sash when closed.

The invention consists in the details of construction and in the combination and arrangement of the several parts of my improved casement window structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Fig. 3 is an enlarged fragmentary sectional view on substantially the same line as Fig. 2 but showing certain of the parts in greater clarity;

Fig. 4 is a fragmentary sectional view also taken substantially on the same line as Fig. 2 but showing certain of the parts in different positions;

Fig. 5 is a view in side elevation of the head comprised in the operating means for the locking disc as herein embodied;

Fig. 6 is a view partly in section and partly in elevation, the line of section being substantially on the line 6—6 of Fig. 3;

Fig. 10 is a sectional view taken substantially on the line 10—10 of Figure 3;

Fig. 11 is a fragmentary view in elevation of a screen as herein embodied illustrating the notch through which the actuator operates;

Figure 1:
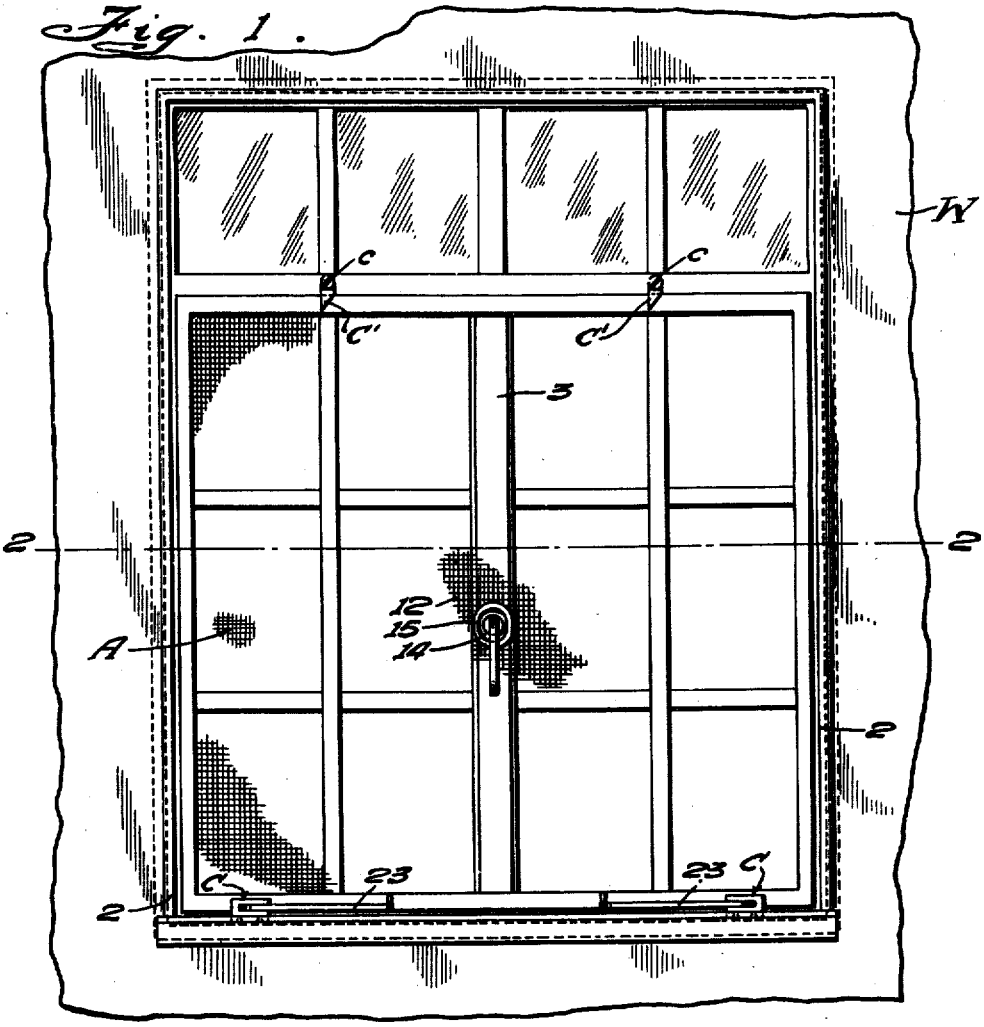
Figure 1 is a view in inside elevation of a casement window structure constructed in accordance with an embodiment of my invention and in applied position within a wall opening.
Figure 2:
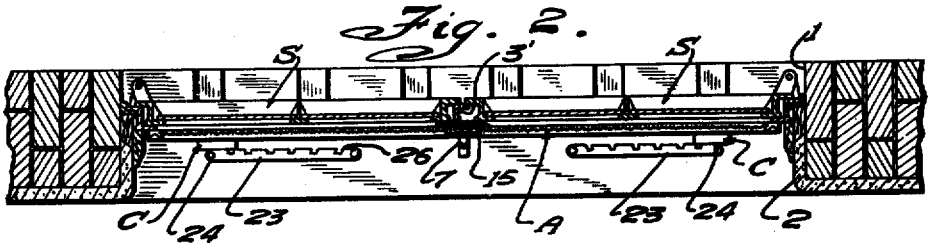
Figure 2 is a sectional view taken substantially on the line 2—2 of Figure 1.
Figure 7:
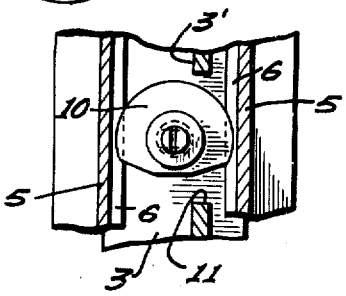
Fig. 7 is a detailed sectional view taken substantially on the line 7—7 of Figure 6.
Figure 8:
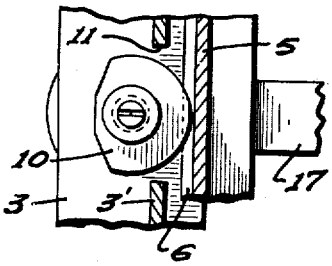
Fig. 8 is a view somewhat similar to Figure 7 but showing the locking disc in a second position.
Figure 9:
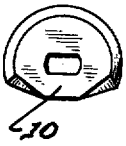
Fig. 9 is a view in front elevation of the locking disc as herein disclosed unapplied.

In the embodiment of my invention as particularly illustrated in Figures 1 to 11 inclusive, W denotes a wall of a building structure provided therethrough with a window opening 1 having associated therewith a well known trim 2. My improved window structure comprises an assembly wherein the window frame F and the outswinging sashes S associated with the frame constitute a unit assembly which, as is particularly illustrated in Figure 3, can be inserted from without within the wall opening 1 without interfering with the fittings 2 or necessitating any special working operations in connection with the structure immediately adjacent to the wall opening and without requiring any building up on the job. It is to be noted at this time that the frame F and sashes S are of skeleton metallic construction ordinarily formed of comparatively small dimensioned flanged bars and, consequently, are what may be termed "shallow" and therefore when the unit assembly is placed within the wall opening 1 such assembly when the sashes S are closely is wholly contained both laterally and transversely within the wall opening. The sashes S when fully closed with respect to the frame F have close engagement with a central vertical dividing bar 3 comprised in the structure of the frame F.

The bar 3, as herein disclosed, comprises a substantially T member of iron with its web flange 3' outwardly disposed and with its outer longitudinal or vertical margin defined by the laterally directed flange 4 herein disclosed as perpendicular with respect to the web flange 3'. The outer or free vertical stiles 5 of the sashes S are of a stepped character providing the contact portions *a* and *b* having direct engagement respectively with the marginal portions of the bar 3 and the flange 4. The portion of each of the stiles 5 having contact with the bar 3 is slightly extended thereby providing an internal shoulder 6 with which is a suitable locking element is adapted to engage for maintaining the sash in fully closed position.

At a desired point intermediate its ends and preferably at substantially the center of the bar 3 is mounted for rotation a head 7 having at the axial center of its inner end a shank 8 directed through a suitably positioned opening 9 in the bar 3. To the outer or free end portion of the shank 8 is suitably affixed a locking disc 10. The disc 10 is formed on a radius of a circular design in excess of a semi-circle and wherein a portion or side of the disc is substantially straight.

The web flange 3' is provided therethrough with an opening 11 through which a peripheral portion of the disc 10 is adapted to project and when the disc 10 is turned or adjusted to have its major diameter substantially horizontally disposed, said disc will have contact with the internal shoulders 6 to effectively lock both of the sashes S when in fully closed position.

By turning the disc 10 to bring the substantially straight portion thereof to the right, the left sash S will be locked in fully closed position independently of the right sash and under which conditions said right sash may be adjusted as desired into open position. By bringing the substantially straight portion of the disc 10 to the left the right sash S will be locked in fully closed position and the left sash be released for desired opening movement.

Disposed over the inner face of the frame F and in close contact therewith is a screen A, the lower member of which resting upon a fixed clip C carried by the lower member of the frame while the upper portion of the applied screen is engaged by the clips C' pivotally connected for swinging movement, as at c, with the upper member of the frame. By turning these clips C' upwardly out of the way a screen may be readily applied or removed and when the clips C' are swung downwardly to engage over the upper portion of the applied screen said screen in connection with the lower clip C is effectively maintained in desired position.

The central portion of the cloth 12 of the screen is provided with a relatively small opening 14, the portion of the cloth defining said opening 14 being reinforced by a suitable binding 15. This opening 14 is of a size to permit the ready passage therethrough of the applied head 7 so that the central portion of the screen will have close contact with the inner face of the bar 3. The outer portion of the head 7 has pivotally connected therewith, as at 16, an elongated arcuate handle 17 which provides convenient means for affecting the desired rotation of the head 7 and the associated disc 10 for locking or releasing the sashes S as desired.

In this operation the handle 17 may be readily swung into a lateral position to assure an effective leverage action, but when it is desired either to apply or remove the screen A this handle may be swung into an intermediate position or in a position constituting substantially a continuity of the outer end of the head 7. This adjustment of the handle 17 together with the radius of its curvature will permit the screen A to be readily swung upon its lower edge as a fulcrum resting on the clip C to either apply or remove the screen.

It is to be particularly noted that the locking disc 10 is carried directly by the frame F and constitutes a part of the unit assembly and that when the assembly is in position within the window opening, said locking disc 10 is also within such opening and also within the opening of the window frame. In this connection it is also clearly shown in the accompanying drawings that normally the handle 17 is within the window opening and that said handle 17 and locking disc 10 are associated as a unitary structure at the lock. In referring to any part being within a wall opening, it is to be understood that this is to be defined as within such opening from front to rear as distinguished from merely in register with such wall opening it is also to be emphasized that the locking disc and the operating handle 17 therefor are entirely supported by the frame F and in no way depend upon the other parts of the window structure, finish, or trim.

Each of the clips C is fixed at a desired point to the lower member of the frame F directly below a cut-out portion or notch 18 provided in the lower member of the applied screen A. This clip C, as herein disclosed, comprises a plate 19 extending from the inner face of the lower member of the frame F substantially at right angles thereto with its outer portion carrying an upstanding boxing 20. The inner face of this boxing 20 is open and the outer closed face 21 having a slot 22 through which an actuator bar 23 is adapted to readily pass in order to effect the desired adjustment of the associated sash S. One end portion of this bar 23 is pivotally connected, as at 24, with an inwardly disposed arm 25 fixed at a desired point to the lower member of a sash S. When the sash S is fully closed the arm 25 is disposed through the notch 18 in the applied screen A and through the slot 22 in the outer face 21 of the boxing 20, said arm 25 in the present embodiment of my invention being horizontally inclined on a predetermined angle toward the hinged marginal portion of the sash S.

The actuator bar 23 along a longitudinal marginal portion thereof is provided with a plurality of spaced notches 26 arranged successively upon varying angles with respect to the longitudinal axis of the actuator bar 23 and in accordance with the various positions of the sash S with respect to the frame F.

As a sash S is adjusted outwardly the same is effectively held in desired open position by causing the portion of the outer wall or facing 21 of the boxing 20 adjacent to an end of the slot 22 to be selectively received within a notch 26.

As before stated, when the sash S is fully closed the arm 25 is directed through the notch 18 in the screen A and the slot 22 and said arm 25 is of a length under such conditions to extend beyond the boxing 20 so that the actuator bar 23 can be readily swung to a position closely adjacent to the bottom member of the frame F and within the window opening 1.

It is to be noted that the actuator bar 23 is also within the window opening 1 and does not interfere with or depend upon other parts of the window structure or finish as it is entirely sustained by its connection with the sash and the support offered by the boxing 20 with which it has slidable engagement.

Figure 12:
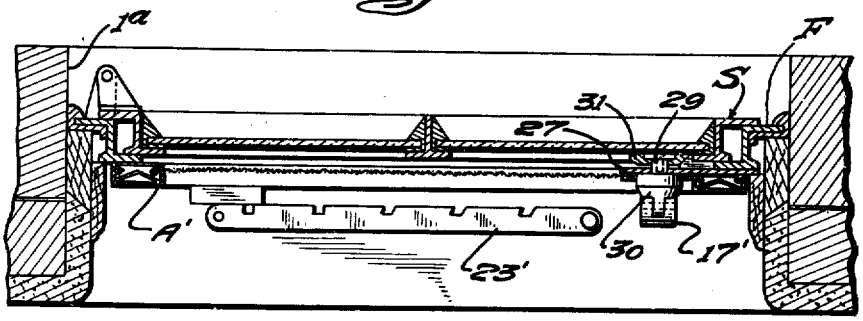
Fig. 12 is a view partly in horizontal section and partly in top plan illustrating a casement window structure constructed in accordance with a further embodiment of my invention.
Figure 13:
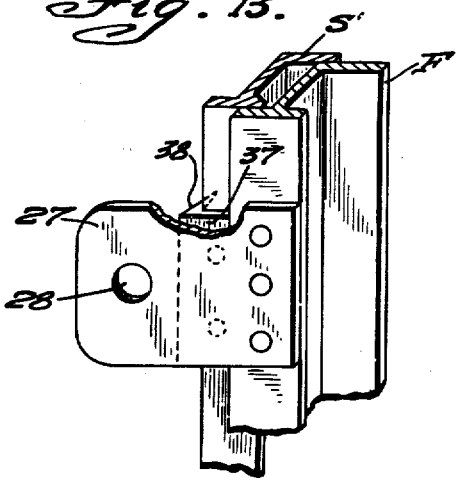
Fig. 13 is a fragmentary view in perspective illustrating coacting members of the window frame and sash together with certain of the parts comprised in the locking means directly associated therewith.
Figure 14:
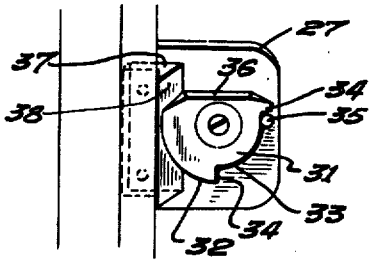
Fig. 14 is a fragmentary view in perspective viewed from without of a portion of the locking means as herein disclosed.

In Figures 12, 13 and 14 of the accompanying drawings, I illustrate an embodiment of my invention wherein a single out-swinging sash S' is associated with the frame F'. In this particular assembly the sash S' is hingedly connected in a well known manner to the frame F' to afford a unitary assembly readily insertible within a window opening 1a. A vertical member of the frame F' adjacent to the out-swinging vertical member of the sash S' at a desired point thereon has anchored thereto an end portion of a plate 27 extending inwardly of the sash S' when said sash is in fully closed position. The extended portion of the plate 27 is provided with an opening 28 through which is directed a shank 29 carried by a head 30. This shank 29 extends inwardly of the plate 27 and to said extended portion is suitably affixed a locking disc 31. This disc 31 has an arcuate beveled marginal portion 32 substantially equal to a quarter of a circle and constituting the locking face of the disc.

The periphery of the disc 31 immediately adjacent to one end of the locking face 32 is provided with an arcuate recess 33 providing spaced shoulders 34 which are adapted to have contact with an outstanding pin 35 carried by the plate 27 whereby the extent of rotation of the disc 31 is positively limited.

The opposite end portion of the beveled working face 32 of the disc 31 is continued by a straight face 36 and so spaced with respect to the axial center of the disc 31 to assure said disc being entirely free of the out-swinging vertical member of the sash S' when the disc 31 has been turned to the limit of its movement in one direction. The out-swinging vertical member of the sash S' at a suitable point thereon has secured thereto an elongated lug 37 having a marginal portion 38 disposed on a bevel complemental to the bevel of the locking face 32 of the disc 31. When the sash S' is in its fully closed position the extended portion of the plate 27 is disposed over the lug 37 and upon requisite turning movement of the disc 31 the working face 32 thereof will have close contact with the bevel face 38 of the lug 37, thus effectively holding the sash tightly in its closed position.

The head 30 has pivotally connected therewith an arcuate operating handle 17' similar to the handle 17 hereinbefore referred to and coacting with the frame F' is a screen A'. The mounting of said screen upon the frame is substantially the same as hereinbefore set forth with respect to the screen A. This screen A' is also constructed substantially the same as the screen A so that the disc 31 may be readily operated without disturbing the applied screen.

The sash S' also has coacting therewith an actuator bar 23' similar to the actuator bar 23 hereinbefore referred to and for which reason a further detailed explanation thereof is believed to be unnecessary.

It will be particularly noted that the screen in each modification is mounted on and directly against the face of the frame and closely adjacent to the sash when closed. This leaves the entire wall opening inside of the screen free from obstructions so that curtains or draperies may be arranged in any manner desired and neither the screen, curtains or draperies need be disturbed in the operation of the sash. The close association of the screen with the frame also makes possible mounting of the curtain and drapery supports directly on the frame and makes feasible the omission of all wood finish and the carrying in of the wall finish into the window opening itself to complete the job. Thus a very sightly, economical and sanitary structure is made possible and extends the completeness of the factory unit.

From the foregoing description it is thought to be obvious that a casement window structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

This application is partly in continuation of an application Serial No. 253,744 filed February 11, 1928, which was pending at the date of filing the application for Patent No. 1,805,403.

What I claim as new is:

1. A casement window structure comprising in combination a frame; an out-swinging sash associated with the frame; an inside screen disposed over the frame; a window lock outside the screen; and an operating means extending through the screen for actuating the lock.

2. A casement window structure comprising in combination a frame; an out-swinging sash associated with the frame; an inside screen disposed over the frame; a window lock outside the screen comprising an operative member mounted on the frame; and an operating means extending through the screen for actuating the lock.

3. A casement window structure comprising in combination a frame; an out-swinging sash associated with the frame; an inside screen disposed over the frame; a window lock outside the screen having an operative member mounted on the frame; and an operating means comprising an operating handle secured to said operating member and insertible through the screen and operative from inside the screen to actuate the lock without disturbing the screen.

4. A casement window structure comprising two members, one of said members constituting the frame and the other an out-swinging sash; a screen disposed over the frame and having an opening, one of the members having a part closing the opening in the screen; a window lock outside the screen; and operating means extending through the opening for actuating the lock.

5. A casement window stucture comprising in combination a frame; an out-swinging sash associated with the frame; an inside screen disposed over the frame; a window lock outside the screen; and operating means extending through the screen for actuating the lock, said operating means comprising an operating handle pivotally secured to said operating member and insertible when extended through the screen and operative from within the screen to actuate the lock without disturbing the screen.

6. A casement window structure comprising in combination a frame; an outswinging sash associated with the frame; an inside screen disposed over the frame; a window lock outside the screen; an operating means extending through the screen for actuating the lock; and means on the frame positioning the screen as it is moved to position on the frame into proper register with the operating means.

7. A casement window structure comprising in combination a frame; an out-swinging sash associated with the frame; an inside screen disposed over the frame; a window lock outside the screen; an operating means extending through the screen for actuating the lock; and means on the frame with which a marginal portion of the screen frame engages, or is engageable to permit said marginal portion to serve as a fulcrum for swinging the screen frame into or away from applied position with respect to the window frame and the lock.

8. A casement window structure comprising a frame, an out-swinging sash coacting with the frame for movement into open or closed position, outstanding holding clips carried by a portion of the frame, a screen adapted to be disposed over the frame closely adjacent thereto, said screen having a marginal portion engaged with the clips, said clips permitting said marginal portion of the screen to serve as a fulcrum for swinging the screen into or away from applied position with respect to the frame, additional means engageable with the screen for holding the same in closed position, locking means carried by a stationary part of the frame for holding the sash in fully closed position, and an operating member for said locking means extending outwardly from the frame, the screen being provided with an opening through which said operating member may be directed.

9. A casement window structure comprising a frame, an out-swinging sash coacting with the frame for movement into open or closed position, a screen adapted to be disposed over the frame closely adjacent thereto, said screen and frame having cooperating parts permitting a marginal portion of the screen to serve as a fulcrum for swinging the screen into or away from applied position with respect to the frame, locking means carried by a stationary part of the frame for holding the sash in fully closed position, and an operating member for said locking means extending outwardly from the frame, the screen being provided with an opening through which said operating member may be directed, said operating member being mounted for swinging movement and being disposed lengthwise on a curvature of a radius approaching the radius of the line of travel of the open portion of the screen when swung toward or from the frame with the hereinbefore stated marginal portion in contact with the clips serving as a fulcrum.

10. A casement window structure comprising, in combination, a frame, an out-swinging sash associated with the frame, an inside screen disposed over the frame and immediately adjacent thereto, locking means carried by the frame and coacting with the sash for holding the sash closed, and an operating member for said means extending therefrom, the screen being provided with an opening through which the operating member is adapted to be directed.

11. A casement window structure comprising, in combination, a frame, an out-swinging sash associated with the frame, an inside screen disposed over the frame and immediately adjacent thereto, locking means carried by the frame and coacting with the sash for holding the sash closed, and an operating member for said means extending therefrom, the screen being provided with an opening through which the operating member is adapted to be directed a part of the frame closing the opening in the screen.

12. A casement window structure comprising, in combination, a frame, an out-swinging sash associated with the frame, an inside screen disposed over the frame and carried thereby, locking means carried by the frame and coacting with the sash for holding the sash closed, and an operating member for said means extending therefrom, the screen being provided with an opening through which the operating member is adapted to be directed.

13. A casement window structure comprising, in combination, a frame, an out-swinging sash associated with the frame, an inside screen disposed over the frame and immediately adjacent thereto, locking means carried by the frame and coacting with the sash for holding the sash closed, and an operating member for said means extending therefrom, the screen being provided with an opening through which the operating member is adapted to be directed, said operating member being pivotally engaged with said locking means.

14. A casement window structure comprising, in combination, a frame, an out-swinging sash associated with the frame, an inside screen disposed over the frame, means for holding the screen to the frame, a portion of said means permitting the screen to swing into or away from applied position with respect to the frame, locking means carried by the frame and coacting with the sash for holding the sash closed, and an operating member for said locking means extending therefrom, the screen being provided with an opening through which said operating member may be directed, said operating member being mounted for swinging movement and being disposed lengthwise on a curvature of a radius approaching the radius of the line of travel of the open portion of the screen when swung toward or from the frame.

15. A window structure comprising a skeleton metal frame, an out-swinging sash on the frame, a window lock having a shaft, an operating handle upon said shaft, and a mounting for said window lock supporting said shaft within the sight opening defined by the outer members of the frame.

16. In a window structure, the combination of the frame having a bar extending across its opening, an out-swinging sash on the frame, a screen for the opening mounted on the frame inside the sash, and means for holding the sash closed, the means having an operating member extending through the screen and supported on the bar between its ends.

17. A casement window comprising a skeleton metal frame, an out-swinging sash on the frame, the frame forming a stop for the sash and a window lock mounted on the frame and comprising a pivoted locking member directly engaging an immediately adjacent part of the free edge of the sash, said lock having a handle mounted on the pivoted member, said frame, sash and lock being adapted to form a fabricated self-contained unit insertible into a window opening and with the handle operable from inside the window.

18. A casement window comprising a skeleton metal frame, an out-swinging sash on the frame, the frame forming a stop for the sash, a window lock mounted on the frame within the sight-line of the frame and directly engaging an immediately adjacent part of the sash, said lock having a handle, said frame, sash and lock being adapted to form a fabricated self-contained unit insertible into a window opening and with the handle operable from inside the window.

19. A casement window comprising a skeleton metal frame, an out-swinging sash on the frame, a frame forming a stop for the sash, a window lock mounted on the frame within the sight-line of the frame and directly engaging an immediately adjacent part of the sash, said lock having a handle, and said frame, sash and lock being adapted to form a standardized fabricated self-contained metal unit insertible into a window opening and with the handle operable from inside the window, and a screen having a screen frame insertible into and from the inside of a wall opening seating on the window frame, and mounted on the room face of the window frame closely adjacent to the sash when closed, said lock being operable without opening the screen.

20. A casement window comprising a skeleton metal frame, an out-swinging sash on the frame, a frame forming a stop for the sash, a window lock mounted on the frame and directly engaging an immediately adjacent part of the free edge of the sash, said lock having a handle, an actuator secured to the sash and mounted on the frame, said frame, sash, lock and actuator being adapted to form a standardized fabricated self-contained metal unit insertible into a window opening and with the lock and actuator operable from inside the window, and a screen having a frame insertible into and from the inside of a wall opening and mounted on the room face of the frame closely adjacent to the sash when closed, said lock and actuator being operable without opening the screen.

21. In a window set of the character set forth as follows: a casement window comprising a skeleton metal frame, an out-swinging sash on the frame, the frame forming a stop for the sash, and a window lock mounted on the frame and directly engaging an immediately adjacent part of the free edge of the sash, said lock having a handle, and said frame, sash and lock being adapted to form a standardized fabricated self-contained metal unit insertible into a window opening and with the handle operable from inside the window; a screen having an opening therethrough designed to receive the handle.

22. A casement window comprising a skeleton metal frame, an out-swinging sash on the frame, the frame forming a stop for the sash, a window lock mounted on the frame and directly engaging an immediately adjacent part of the free edge of the sash, said lock having a handle, an actuator secured to the sash and mounted on the frame, said frame, sash, lock and actuator being adapted to form a standardized fabricated self-contained metal unit insertible into a window opening and with the lock and actuator operable from inside the window, wherein the room face of the frame, the lock and the actuator are constructed and arranged to permit a screen to be mounted on the room face of the frame closely adjacent the sash when closed and to permit the lock and actuator to lock and open and close the sash when a screen is so mounted without opening the screen.

23. A casement window comprising a skeleton metal frame, an out-swinging sash on the frame, the frame forming a stop for the sash, a window lock mounted on the frame and directly engaging an immediately adjacent part of the free edge of the sash, said lock having a handle; an actuator secured to the sash and mounted on the frame, said frame, sash, lock and actuator being adapted to form a standardized fabricated self-contained metal unit insertible into a window opening and with the lock and actuator operable from inside the window, a screen having a frame insertible into and from the inside of a wall opening and mounted on the room face of the frame closely adjacent to the sash when closed, said lock and actuator being operable without opening the screen, and devices on the frame acting on the screen frame as a fulcrum securing the edges of the screen and positioning the screen with relation to the frame, lock and actuator as it is swung to place.

24. A casement window comprising a skeleton metal frame, an out-swinging sash on the frame, the frame forming a stop for the sash, a window lock mounted on the frame and directly engaging an immediately adjacent part of the free edge of the sash, said lock having a handle, an actuator secured to the sash and mounted on the frame, said frame, sash, lock and actuator being adapted to form a standardized fabricated self-contained metal unit insertible into a window opening and with the lock and actuator operable from inside the window, the room face of the frame, the lock and the actuator being so constructed and arranged as to permit a screen to be mounted on the room face of the frame closely adjacent the sash when closed and yet permit the lock and actuator to be operated and the sash open and close when a screen is so mounted without opening the screen, and devices on the frame adapted to act on a screen frame as a fulcrum securing the edges of the screen and positioning the screen with relation to the frame, lock and actuator as the screen is swung to place.

THEODORE JOHNSON.

DISCLAIMER

Re. 20,540.—*Theodore Johnson*, Erie, Pa. CASEMENT WINDOW STRUCTURE. Patent dated October 26, 1937. Disclaimer filed October 17, 1938, by the assignee, *Johnson Metal Products Co.*, and the licensee, *Detroit Steel Products Company*.

Hereby disclaim claims 20 and 22 of said reissue patent.

[*Official Gazette November 1, 1938.*]